(12) United States Patent
Frank

(10) Patent No.: US 8,191,065 B2
(45) Date of Patent: May 29, 2012

(54) MANAGING VIRTUAL MACHINE IMAGES

(75) Inventor: Shahar Frank, Ramat Hasharon (IL)

(73) Assignee: Red Hat Israel, Ltd., Raanana (IL)

(*) Notice: Subject to any disclaimer, the term of this patent is extended or adjusted under 35 U.S.C. 154(b) by 504 days.

(21) Appl. No.: 12/419,256

(22) Filed: Apr. 6, 2009

(65) Prior Publication Data

US 2010/0257523 A1    Oct. 7, 2010

(51) Int. Cl.
G06F 9/455    (2006.01)
(52) U.S. Cl. ............................................ 718/1; 718/100
(58) Field of Classification Search .................. None
See application file for complete search history.

(56) References Cited

U.S. PATENT DOCUMENTS

| | | | |
|---|---|---|---|
| 7,447,854 B1* | 11/2008 | Cannon | 711/162 |
| 8,082,406 B1* | 12/2011 | Singh et al. | 711/162 |
| 2006/0155674 A1 | 7/2006 | Traut et al. | |
| 2007/0234356 A1* | 10/2007 | Martins et al. | 718/1 |
| 2007/0300220 A1* | 12/2007 | Seliger et al. | 718/1 |
| 2009/0198731 A1* | 8/2009 | Noonan, III | 707/104.1 |
| 2009/0260007 A1* | 10/2009 | Beaty et al. | 718/1 |
| 2009/0292737 A1* | 11/2009 | Hayton | 707/200 |
| 2010/0251363 A1* | 9/2010 | Todorovic | 726/22 |

OTHER PUBLICATIONS

Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Emerson Puente
*Assistant Examiner* — Dong Kim
(74) *Attorney, Agent, or Firm* — Lowenstein Sandler PC (57) ABSTRACT

A method and system for managing images of virtual machines hosted by a server. The server maintains a base virtual machine image in a common data store for sharing by the virtual machines. When the server identifies an image modification for at least one of the virtual machines, the server determines whether the image modification includes data common to images of the other virtual machines. If so, the common data is copied to the base virtual machine image in the common data store, and a pointer to the copied data is added to an image of the virtual machine in an individual data store.

23 Claims, 6 Drawing Sheets

MANAGING VIRTUAL MACHINE IMAGES

TECHNICAL FIELD

Embodiments of the present invention relate to management of virtual machines, and more specifically, to the management of virtual machine images.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

In some systems, the host is a centralized server that is partitioned into multiple virtual machines to provide virtual desktops to users within an enterprise. An image of a virtual machine may include codebase of an operating system (a guest operating system) and applications running on the guest operating system, as well as libraries and data used by the guest operating system and the applications. The size of a typical virtual machine image is substantial. For example, an enterprise's virtual machine image is usually more than 10 GB. Hence, in an enterprise with 1,000 users, the storage requirement for virtual machine images is likely to exceed 10 TB. Maintaining such a large amount of storage is expensive and inefficient.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for managing images of virtual machines hosted by a server are described herein. The system may include a common data store to store a base virtual machine image shared by the virtual machines, and one or more individual data stores to store incremental images specific to respective virtual machines. The server detects image modifications that are common to the virtual machines, and copies these common modifications to the base virtual machine image in the common data store. In addition, the server adds pointers to the copied modifications in the common data store to incremental VM images in the individual data stores.

Embodiments of the present invention significantly reduce the amount of storage required for virtual machine images, and simplifies the management of virtual machine images. In addition, with embodiments of the present invention, new virtual machine images can be easily created, and existing virtual machine images can be efficiently archived and backed up.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "de-allocating", "linking", "modifying", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
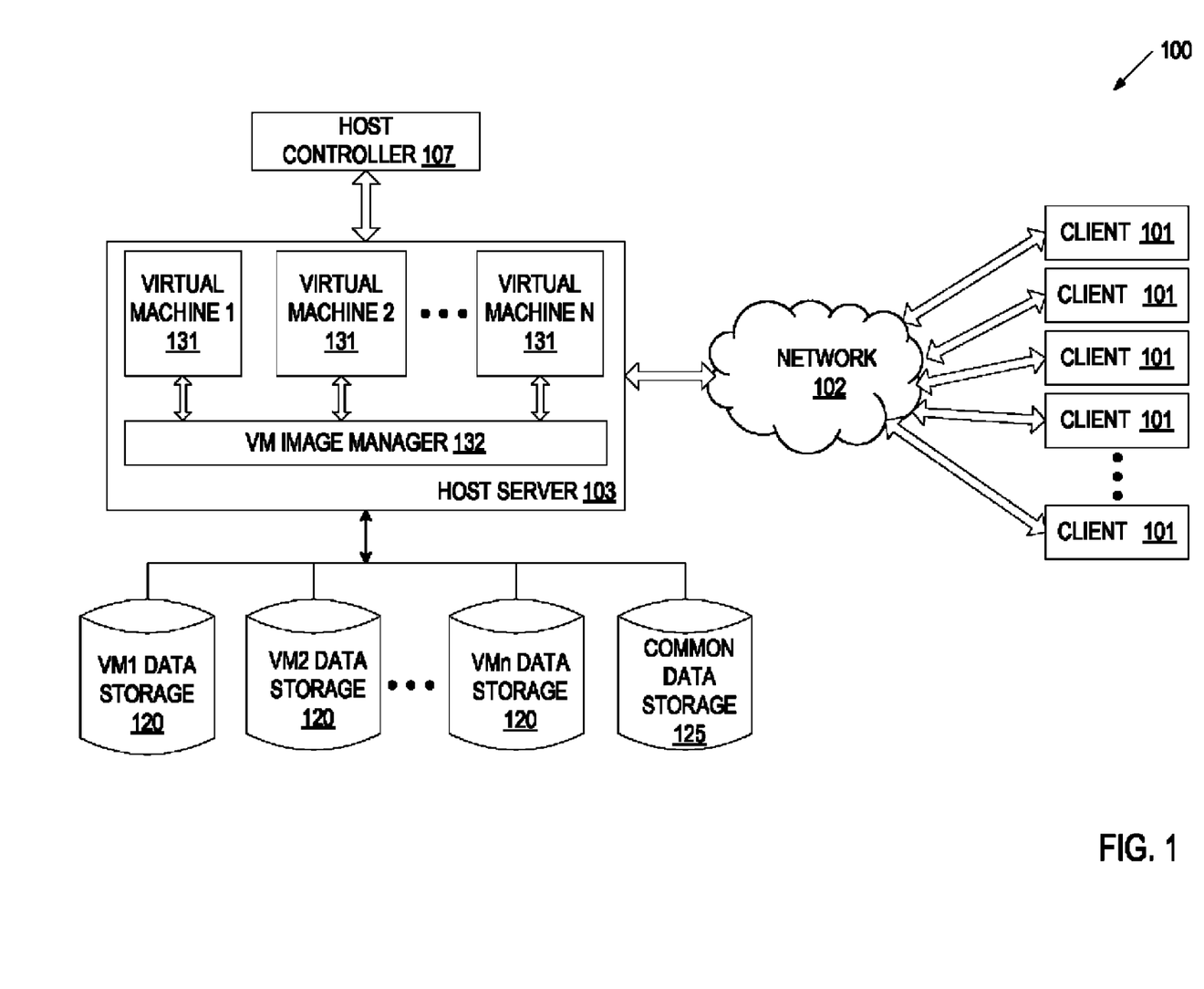
FIG. 1 illustrates an exemplary network architecture in which embodiments of the present invention may operate.

FIG. 1 illustrates an exemplary network architecture 100 in which embodiments of the present invention may operate. The network architecture 100 may include a host 103 coupled to one or more clients 101 over a network 102. The network 102 may be a private network (e.g., a local area network (LAN), wide area network (WAN), intranet, etc.) or a public network (e.g., the Internet). The host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more virtual machines 131. Each virtual machine 131 runs a guest operating system (OS) that may be different from one another. The guest OS may include Microsoft Windows, Linux, Solaris, Mac OS, etc. The host 103 may include a hypervisor (not shown) that emulates the underlying hardware platform for the virtual machines 131. The hypervisor may also be known as a virtual machine monitor (VMM), a kernel-based hypervisor or a host operating system.

Each virtual machine 131 can be accessed by one or more of the clients 101 over the network 102. In one scenario, the virtual machine 131 can provide a virtual desktop for the client 101. The virtual machines 131 can be managed by the host controller 107. The host controller 107 may also add a virtual machine, delete a virtual machine, balance the load on the server cluster, provide directory service to the virtual machines 131, and perform other management functions.

The host 103 may also be coupled to data storage 120. Data storage 120 may represent multiple storage devices (e.g., disks in a disk array) associated with individual virtual machines 131, or a single storage device (e.g., hard drive of the host 103) including areas designated for individual virtual machines 131. When a virtual machine is created, it is associated with an individual data storage 120, which may be an independent storage device or a designated area of the storage device.

The host 103 may further be coupled to data storage 125 directly or remotely. Data storage 125 may represent a designated area of the same storage device as data storage 102 (e.g., a disk drive), or an independent storage device coupled with the host 103 directly (e.g., a disk drive) or remotely (e.g., network attached storage (NAS), etc.).

In one embodiment, the host 103 includes a virtual machine (VM) image manager 132 that may be part of the hypervisor or be controlled by the hypervisor. The VM image manager 132 manages images of virtual machines 131. A virtual machine (VM) image may include, for example, codebase of the guest operating system and applications running in the virtual machine 131, and libraries and data used by the guest operating system and the applications. The data may be stored in databases, repositories and files and may be specified by a user or generated by the guest operating system or the applications. A VM image may include components required by all users of clients 101 (e.g., installation files of a guest operating system, a web browser application, an anti-virus application, an email application, etc.) and components specific to individual users (e.g., profiles, user specific applications, etc.).

In one embodiment, the VM image manager 132 stores VM image components required by all users of clients 101 in common storage 125 as a base VM image, and stores user-specific components in individual storage 120 of a respective VM as an incremental image of the respective VM. The incremental image of the VM includes pointers to data in the base VM image from the common storage 125. The base VM image can be marked "copy-on-write" to allow modification of its data elements by individual VMs. The base VM image may include data elements (e.g., blocks, files, etc.) and hashes of the data elements.

In one embodiment, the VM manager 132 uses the base VM image as a template for creating new VM images (e.g., new virtual desktop images). In addition, the VM manager 132 may archive and backup VM images by creating a copy of the base VM image and copies of individual incremental VM images.

Figure 2:
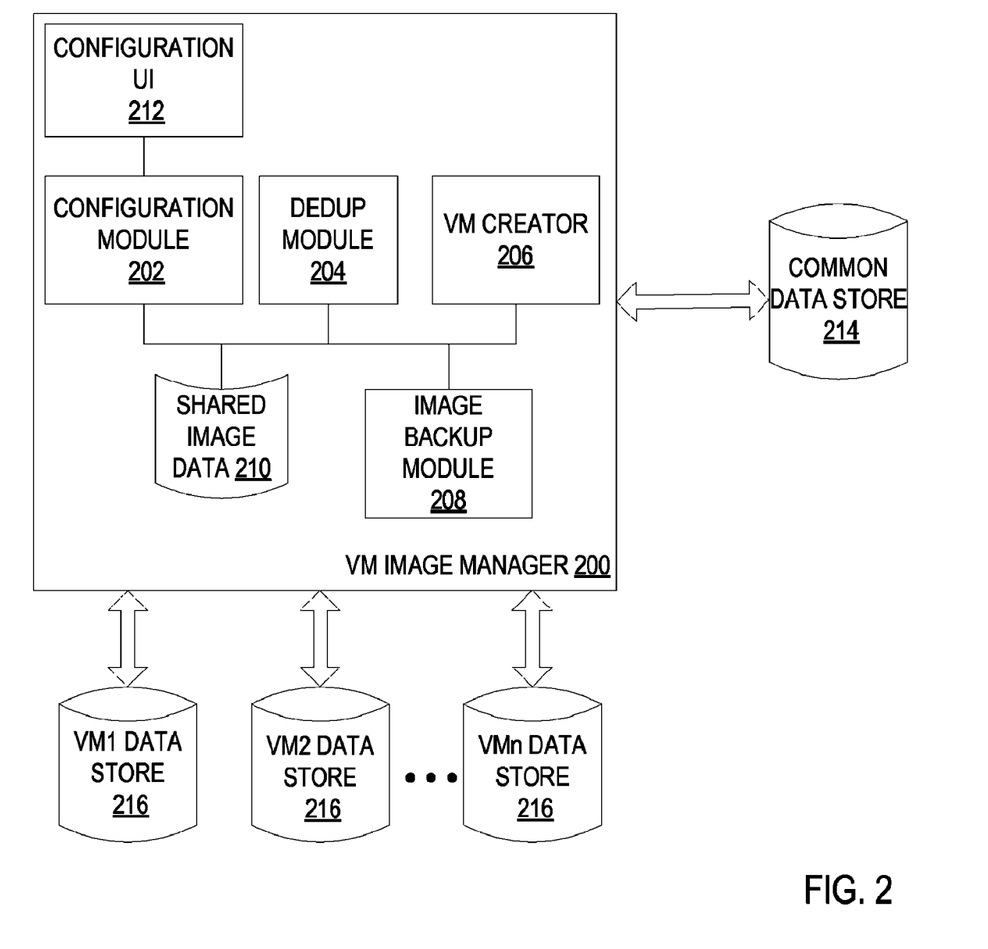
FIG. 2 is a block diagram illustrating one embodiment of a virtual machine image manager.

FIG. 2 is a block diagram of one embodiment of a VM image manager 200. The VM image manager 200 may include a configuration module 202, a de-duplication (dedup) module 204, a VM creator 206, and an image backup module 208. The VM image manager 200 may be hosted by the server 103 or a different machine coupled to the server 103. In one embodiment, the components of the VM image manager 200 may reside on different machines. For example, the configuration module 202 may reside on the host controller 107 and the other components may reside on the server 103.

In one embodiment, the VM image manager 200 is coupled with data stores 216, each associated with a specific VM. The data stores 216 may reside on the same data storage device or different data storage devices. In addition, the VM image manager 200 is coupled to a common data store 214 that may reside on the same data storage device as data stores 216 or an independent data storage device.

The configuration module 202 provides a configuration user interface (UI) 212 allowing a user (a system administrator) to configure the VM image manager 200. The configuration UI 212 may allow a system administrator to specify what components should be included in a VM image. For example, in addition to software (operating system and applications) and associated libraries and databases, the system administrator may include, in a VM image, user data such as user profiles, user documents, user messages and attachments, etc.

The configuration UI 212 may also allow a system administrator to specify a group of existing VMs that should share a base VM image in the common data store 214. In one embodiment, the configuration module 202 automatically creates a group of VMs that are likely to have similar images (e.g., VMs with the same operating system, VMs with users from the same department, etc.). The configuration UI 212 may then display this group of VMs to the system administrator and allow the system administrator to modify or accept the group. For a newly created VM, the configuration UI 212 may assist the system administrator in deciding what group this new VM should belong to. For example, the configuration module 202 may determine what group the new VM should belong to based on characteristics of the new VM (e.g., its operating system, intended user tasks, etc.) and may present this information to the system administrator via the configuration UI 212.

The resulting shared image data may be stored in data storage 210. The shared image data may specify what components should be included in a VM image, and may list VMs that should share the base VM image.

The dedup module 204 updates the base VM image with changes that are common to all the VMs and adds VM-specific data to incremental images of respective VMs. Common changes may include, for example, a software patch for guest operating systems or applications of the VMs, addition of an application to the VMs, removal of an application from the VMs, update of persistent data used by the guest operating systems or applications of the VMs (e.g., update of antivirus databases of the VMs), update of user data accessible to end-users of the VMs (e.g., addition of multimedia files distributed to all end-users of the VMs via email), etc. The dedup module 204 operates using the shared image data 210 that identifies the VMs sharing the base VM image in the common data store 214, and specifies what components should be included in a VM image.

In one embodiment, the dedup module 204 identifies common changes in real-time. In another embodiment, the dedup module 204 identifies common changes offline. In yet another embodiment, the dedup module 204 includes both real-time and offline operations.

In real-time, the dedup module 204 detects a request to modify images of one or more VMs, and determines whether the request is applicable to other VMs. If so (e.g., if the request is to upgrade an application that is part of each VM), the dedup module 204 copies the requested modification to the base VM image in the common data store 214, and adds a pointer to the copied data to each incremental VM image. If the request does not apply to all VMs, the dedup module 204 may further determine whether the requested modification includes any data from the common data store 214. In one embodiment, the dedup module 204 makes this determination by calculating a hash value for each data element of the requested modification (e.g., each data block or file), and comparing the calculated hash values with hash values of data elements in the common data store 214. If the dedup module 204 finds a match, it replaces the matching data element in the requested modification with a pointer to a corresponding data element in the common data store 214, and adds the resulting (de-duped) modification to the incremental image of the VM in the VM data store 216. Otherwise, the dedup module 204 adds the original modification to the incremental image of the VM.

When operating off-line, the dedup module 204 scans the VM data stores 216 to find common data. In one embodiment, scanning is performed by calculating hashes of data elements (e.g., data blocks, files, etc.) in the VM data stores 216 and comparing the calculated hashes. Upon finding data elements common to all VMs, the de-dup module 204 copies the found data elements to the base VM image in the common data store 214, and replaces the found data elements in the VM data stores 216 with the pointer to the corresponding data in the base VM image. In another embodiment, the dedup module 204 calculates hash values for data elements in each VM data store 216, and compares the calculated hash values with hash values of data elements in the common data store 214. If the dedup module 204 finds a match, it replaces the matching data element in the VM data store 216 with a pointer to a corresponding data element in the common data store 214.

The VM creator 206 creates a new VM using a relevant base VM image as a template. For example, if the system administrator specifies (e.g., via the configuration UI 212) that the new VM should be part of the VM group that shares the base image in the common data store 214, the VM creator 206 creates an incremental image of the new VM, including only a pointer to the base image from the common data store 214. Subsequently, if requested by a user, the VM creator 206 may add user-specific applications and data to the incremental image of the new VM.

The image backup module 208 is responsible for creating archives and backups of the VM images. In particular, the VM images can be archived and backed up by copying the base VM image from the common data store 214, and incremental images from the VM data stores 216.

Figure 3:
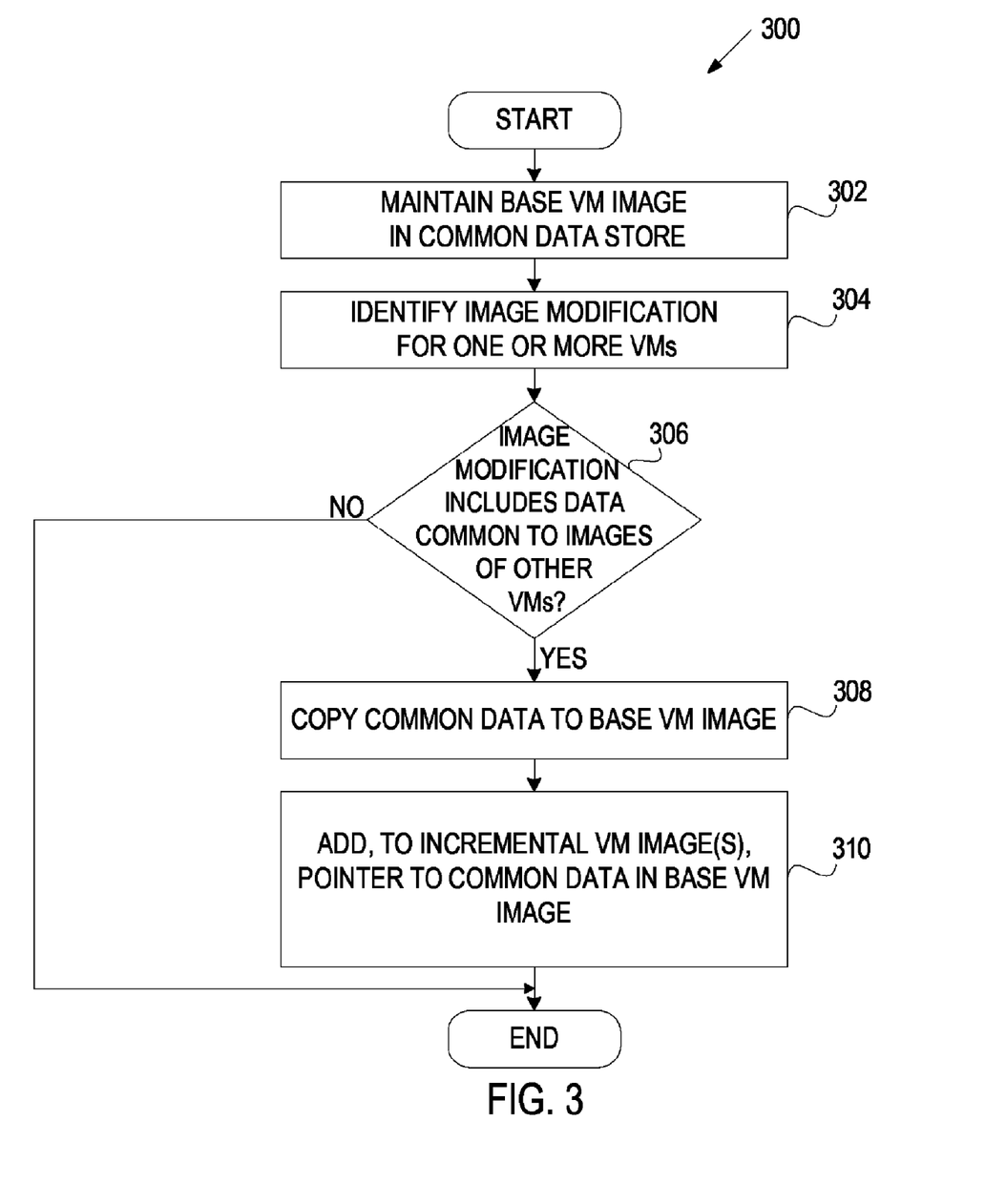
FIG. 3 is a flow diagram illustrating a method for managing virtual machine images in accordance with one embodiment of the present invention.

FIG. 3 is a flow diagram illustrating one embodiment of a method 300 for managing VM images. The method 300 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the VM image manager 132 on the host 103 (FIG. 1).

Referring to FIG. 3, processing logic maintains a base VM image in a common data store (block 302). As discussed above, the base VM image includes data that is common to a group of VMs. In one embodiment, the base VM image is marked "copy-on-write." Processing logic also maintains an incremental image for each VM that includes data specific to a respective VM. The incremental image includes a pointer to corresponding data in the base VM image.

At block 304, processing logic identifies image modification for one or more VMs. Processing logic may identify the image modification in real-time (e.g., when receiving a request to modify an image of one or more VMs) or offline (e.g., during a scan of incremental VM images if an incremental VM image includes data that did not exist during a previous scan).

At block 306, processing logic determines whether the image modification includes data common to other VMs. If not, method 300 ends. If so, processing logic copies the common data to the base VM image (block 308) and adds, to the incremental VM image, a pointer to the copied data (block 310).

Blocks 304 through 310 will now be discussed in more detail in the context of real-time and offline operations using FIGS. 4 and 5 respectively.

Figure 4:
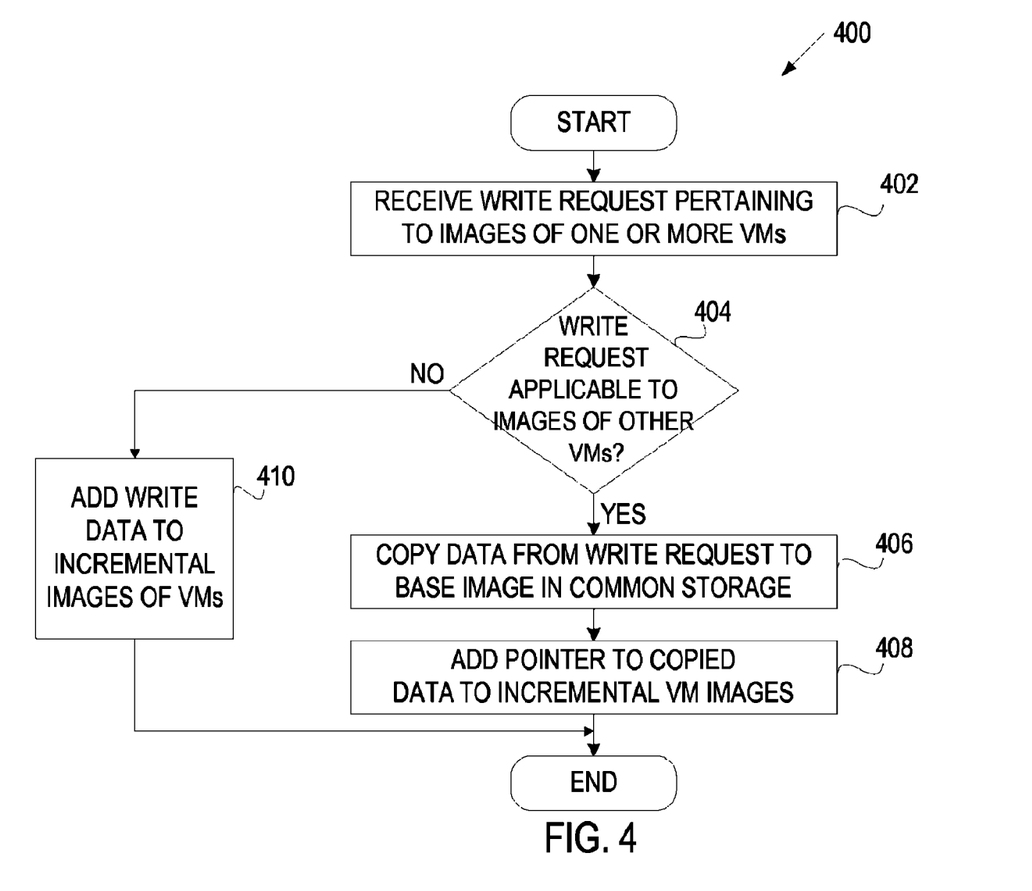
FIG. 4 is a flow diagram illustrating a method for updating a base virtual machine image using real-time dedup, in accordance with one embodiment of the present invention.

FIG. 4 is a flow diagram illustrating one embodiment of a method 400 for updating a base VM image using real-time dedup. The method 400 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the VM image manager 132 on the host 103 (FIG. 1).

Referring to FIG. 4, method 400 begins with processing logic receiving a write request pertaining to images of VMs (block 402). A write request may be submitted by a system administrator (e.g., a request to upgrade guest operating systems), by an end user (e.g., a request to update a user profile) or by software (e.g., a request of an antivirus service to update an antivirus database).

At block 404, processing logic determines whether the write request is applicable to images of other VMs. In one embodiment, processing logic makes this determination to verify that the request is applicable to all VMs sharing the base VM image. In another embodiment, processing logic makes this determination to verify that the request is applicable to a substantial number of VMs sharing the base VM image, as opposed to all VMs.

If the determination at block 404 is positive, processing logic copies the write data to the base VM image (block 406). Depending on whether the write request asks for an update or an insert, processing logic may either replace existing data in the base VM image with the write data or insert the write data into the base VM image. In addition, processing logic adds, to an incremental image of each VM, a pointer to the copied data in the base VM image (block 408).

If the determination at block 404 is negative, in one embodiment, processing logic adds the write data to the incremental image(s) of the VM(s) specified in the request (block 410). In another embodiment, in which the base VM image is updated when images of a substantial number of VMs (but not all VMs) are modified, processing logic performs different operations. In particular, in this other embodiment (not shown), if the determination at block 410 is negative, processing logic further determines whether the write request includes any data from the base VM image (e.g., using a hash function). If not, processing logic adds the write data to the incremental image(s) of the VM(s) specified in the request. Otherwise, processing logic adds, to the incremental VM image(s), a pointer to the matching data in the base VM image.

Figure 5:
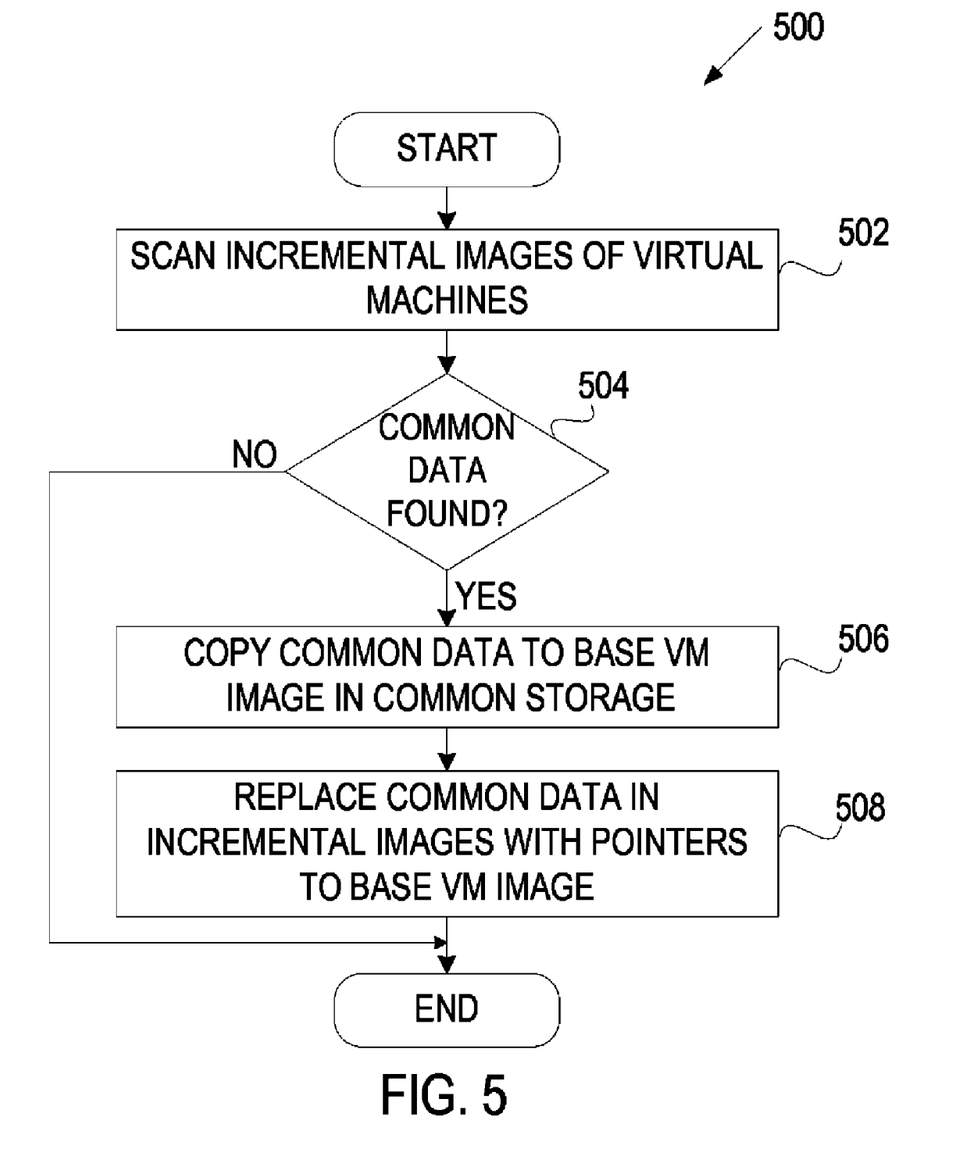
FIG. 5 is a flow diagram illustrating a method for updating a base virtual machine image using offline dedup, in accordance with one embodiment of the present invention.

FIG. 5 is a flow diagram illustrating one embodiment of a method 500 for updating a base VM image using offline dedup. The method 500 may be performed by processing logic 626 of FIG. 6 that may comprise hardware (e.g., circuitry, dedicated logic, programmable logic, microcode, etc.), software (e.g., instructions run on a processing device to perform hardware simulation), or a combination thereof. In one embodiment, the method 500 is performed by the VM image manager 132 on the host 103 (FIG. 1).

Referring to FIG. 5, method 500 begins with processing logic scanning incremental images of virtual machines that share a base VM image (block 502). Scanning may be performed periodically (e.g., once a day) and may affect only data changed since the previous scan.

At block 504, processing logic determines whether the incremental images of virtual machines include common data. If not, method 500 ends. If so, processing logic copies common data to the base VM image (block 506) and replaces, in each incremental image, the common data with a pointer to the respective data in the base VM image (block 508).

In another embodiment (not shown), processing logic calculates hash values for data elements in incremental images of virtual machines, and compares the calculated hash values with hash values of data elements in the base VM image. If a match is found, processing logic replaces the matching data element in an incremental image with a pointer to a corresponding data element in the base VM image.

Figure 6:
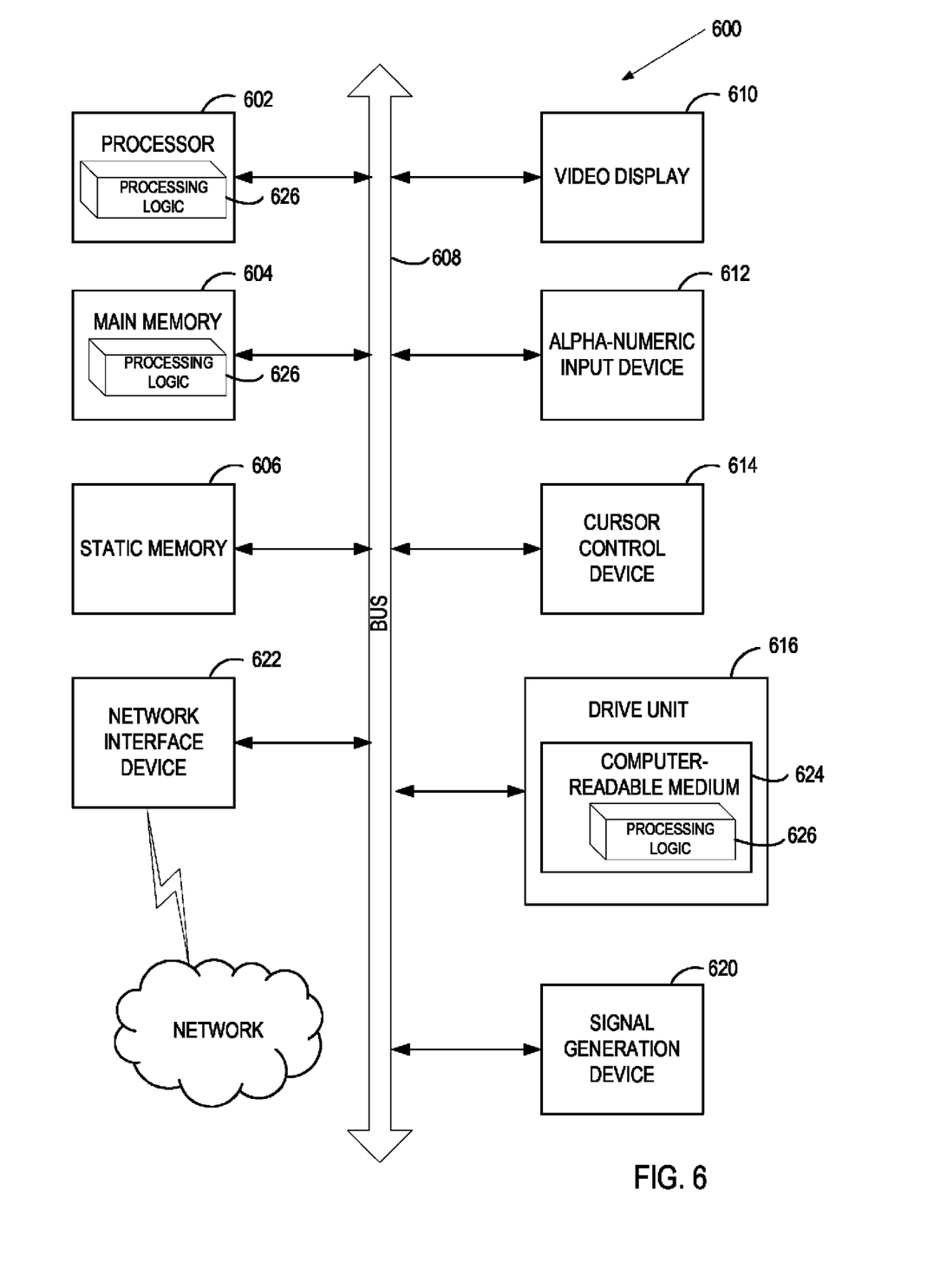
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server (e.g., the host 103) or a client machine (e.g., the client 101) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., processing logic 626) embodying any one or more of the methodologies or functions described herein. The processing logic 626 may also reside, completely or at least partially, within the main memory 604 and/or within the processing device 602 during execution thereof by the computer system 600, the main memory 604 and the processing device 602 also constituting machine-readable storage media. The processing logic 626 may further be transmitted or received over a network via the network interface device 622.

The machine-readable storage medium 624 may also be used to store the VM image manager 132 of FIG. 1. While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for a server running a plurality of virtual machines, the method comprising:
   maintaining, by the server, a base virtual machine image in a common data store, the base virtual machine image being shared by the plurality of virtual machines;
   identifying, by the server, an image modification for at least one of the plurality of virtual machines;
   determining, by the server, that the image modification includes data common to images of the other virtual machines;
   in response to the determining, copying the common data to the base virtual machine image in the common data store; and
   adding, to an image of the at least one of the plurality of virtual machines in an individual data store, a pointer to the copied data from the common data store.

2. The method of claim 1, wherein the image modification comprises at least one of:
   a software patch for a guest operating system of the virtual machine;
   a removal or addition of an application to a virtual machine;
   a software patch for an application of the virtual machine;
   an update of persistent data used by the guest operating system or an application of the virtual machine; and
   an update of user data accessible to an end user of the virtual machine.

3. The method of claim 1, wherein:
   the virtual machine runs a virtual desktop for one or more end users; and
   the image of the virtual machine comprises an image of the virtual desktop.

4. The method of claim 1, wherein determining, by the server, that the image modification includes data common to images of the other virtual machines comprises:
   calculating a hash value of each data block of the image modification; and
   comparing the calculated hash values with hash values of data blocks in the common data store.

5. The method of claim 1, wherein the identifying, the determining, the copying and the adding are performed in real-time in response to a write request.

6. The method of claim 5, wherein the write request is initiated by any one of a user of the virtual machine, a guest operating system of the virtual machine, and an application of the virtual machine.

7. The method of claim 1, wherein identifying, by the server, an image modification for at least one of the plurality of virtual machines comprises:
   periodically scanning images of the plurality of virtual machines to find common data.

8. The method of claim 1, further comprising:
   providing a user interface facilitating user selection of virtual machines for sharing the base virtual machine image.

9. The method of claim 8, wherein the user interface presents a list of virtual machines that are likely to have similar virtual machine images.

10. The method of claim 1, further comprising:
    creating an image of a new virtual machine using the base virtual machine image.

11. The method of claim 1, further comprising:
    archiving images of the plurality of virtual machines using the base virtual machine image.

12. A system comprising:
    a common data store to store a base virtual machine image shared by a plurality of virtual machines;
    a plurality of individual data stores to store incremental images of respective virtual machines; and
    at least one server, coupled to the common data store and the plurality of individual data stores, the at least one server configured to:
       detect image modifications that are common to the plurality of virtual machines;
       in response to the detection, copy the common modifications to the base virtual machine image in the common data store; and
       add, to the incremental images in the individual data stores, pointers to the copied modifications from the common data store.

13. The system of claim 12, wherein the image modification comprises at least one of:
    a software patch for a guest operating system of the virtual machine;
    a removal or addition of an application to a virtual machine;
    a software patch for an application of the virtual machine;
    an update of persistent data used by the guest operating system or an application of the virtual machine; and
    an update of user data accessible to an end user of the virtual machine.

14. The system of claim 12, wherein the server determines that the image modification includes data common to images of the other virtual machines by:
    calculating a hash value of each data block of the image modification; and
    comparing the calculated hash values with hash values of data blocks in the common data store.

15. The system of claim 12, wherein the identifying, the determining, the copying and the adding are performed in real-time in response to a write request.

16. The system of claim 12, wherein the server identifies an image modification for at least one of the plurality of virtual machines by:
periodically scanning images of the plurality of virtual machines to find common data.

17. The system of claim 12, further comprising:
a user interface to facilitate user selection of virtual machines for sharing the base virtual machine image, the user interface presenting a list of virtual machines that are likely to have similar virtual machine images.

18. The system of claim 12, wherein the server is further to:
create an image of a new virtual machine using the base virtual machine image.

19. The system of claim 12, wherein the server is further to:
archive images of the plurality of virtual machines using the base virtual machine image.

20. A non-transitory computer readable storage medium including instructions that, when executed by a processing system, cause the processing system to perform a method comprising:
maintaining a base virtual machine image in a common data store, the base virtual machine image being shared by the plurality of virtual machines;
identifying an image modification for at least one of the plurality of virtual machines;
determining that the image modification includes data common to images of the other virtual machines;
in response to the determining, copying the common data to the base virtual machine image in the common data store; and
adding, to an image of the at least one of the plurality of virtual machine in an individual data store, a pointer to the copied data from the common data store.

21. The non-transitory computer readable storage medium of claim 20, wherein the image modification comprises at least one of:
a software patch for a guest operating system of the virtual machine;
a removal or addition of an application to a virtual machine;
a software patch for an application of the virtual machine;
an update of persistent data used by the guest operating system or an application of the virtual machine; and
an update of user data accessible to an end user of the virtual machine.

22. The non-transitory computer readable storage medium of claim 21, wherein determining that the image modification includes data common to images of the other virtual machines comprises:
calculating a hash value of each data block of the image modification; and
comparing the calculated hash values with hash values of data blocks in the common data store.

23. The non-transitory computer readable storage medium of claim 20, wherein identifying an image modification for at least one of the plurality of virtual machines comprises:
periodically scanning images of the plurality of virtual machines to find common data.

* * * * *